(12) United States Patent
Meijer et al.

(10) Patent No.: US 8,402,110 B2
(45) Date of Patent: Mar. 19, 2013

(54) REMOTE PROVISIONING OF INFORMATION TECHNOLOGY

(75) Inventors: Henricus Johannes Maria Meijer, Mercer Island, WA (US); William H. Gates, III, Medina, WA (US); Raymond E. Ozzie, Seattle, WA (US); Gary W. Flake, Bellevue, WA (US); Thomas F. Bergstraesser, Kirkland, WA (US); Arnold N. Blinn, Hunts Point, WA (US); Christopher W. Brumme, Mercer Island, WA (US); Lili Cheng, Bellevue, WA (US); Nishant V. Dani, Redmond, WA (US); Daniel S. Glasser, Mercer Island, WA (US); Alexander G. Gounares, Kirkland, WA (US); Galen C. Hunt, Bellevue, WA (US); James R. Larus, Mercer Island, WA (US); Matthew B. MacLaurin, Woodinville, WA (US); Debi P. Mishra, Bellevue, WA (US); Amit Mital, Kirkland, WA (US); Ira L. Snyder, Jr., Bellevue, WA (US); Chandramohan A. Thekkath, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 741 days.

(21) Appl. No.: 11/613,917

(22) Filed: Dec. 20, 2006

(65) Prior Publication Data

US 2008/0082546 A1 Apr. 3, 2008

Related U.S. Application Data

(63) Continuation-in-part of application No. 11/536,578, filed on Sep. 28, 2006.

(51) Int. Cl.
*G06F 15/16* (2006.01)
(52) U.S. Cl. .................................... 709/217; 709/226
(58) Field of Classification Search .................. 709/217, 709/226
See application file for complete search history.

(56) References Cited

U.S. PATENT DOCUMENTS

| 5,263,165 A | 11/1993 | Janis |
| 5,495,576 A | 2/1996 | Ritchey |
| 5,537,404 A | 7/1996 | Bentlet et al. |

(Continued)

FOREIGN PATENT DOCUMENTS

| EP | 0915595 A2 | 12/1999 |
| EP | 1058429 A1 | 12/2000 |

(Continued)

OTHER PUBLICATIONS

VMware Announces VDC-OS, vCloud http://www.byteandswitch.com/document.asp?doc_id=163701. Last accessed on Nov. 27, 2008, 6 pages.

(Continued)

*Primary Examiner* — Dustin Nguyen
*Assistant Examiner* — Joel Mesa
(74) *Attorney, Agent, or Firm* — Lee & Hayes, PLLC

(57) ABSTRACT

Remote provisioning of an IT network and/or associated services is provided. Hardware, software, service and/or expertise can be moved from on-premise to a remote location (e.g., central, distributed . . . ). Accordingly, at least a large degree computation can be moved to the center to exploit economies of scale, among other things. In such an architecture, computational resources (e.g., data storage, computation power, cache . . . ) can be pooled, and entities can subscribe to a particular level of resources related to a private entity IT network.

20 Claims, 14 Drawing Sheets

U.S. PATENT DOCUMENTS

| | | | |
|---|---|---|---|
| 5,588,914 | A | 12/1996 | Adamczyk |
| 5,771,279 | A | 6/1998 | Cheston |
| 5,859,972 | A | 1/1999 | Subramaniam et al. |
| 6,064,656 | A | 5/2000 | Angal et al. |
| 6,185,567 | B1 | 2/2001 | Ratnaraj et al. |
| 6,195,683 | B1 | 2/2001 | Palmer et al. |
| 6,209,039 | B1 | 3/2001 | Albright et al. |
| 6,226,260 | B1 | 5/2001 | McDysan |
| 6,314,459 | B1 | 11/2001 | Freeman |
| 6,341,127 | B1 | 1/2002 | Katsube et al. |
| 6,409,599 | B1 | 6/2002 | Sprout et al. |
| 6,415,288 | B1 | 7/2002 | Gebauer |
| 6,434,532 | B2 | 8/2002 | Goldband et al. |
| 6,469,991 | B1 | 10/2002 | Chuah |
| 6,496,482 | B1 | 12/2002 | Kubota |
| 6,523,065 | B1 | 2/2003 | Combs et al. |
| 6,620,043 | B1 | 9/2003 | Haseltine et al. |
| 6,707,820 | B1 | 3/2004 | Arndt et al. |
| 6,745,224 | B1 | 6/2004 | D'Souza et al. |
| 6,823,382 | B2 | 11/2004 | Stone |
| 6,917,975 | B2 | 7/2005 | Griffin et al. |
| 6,961,318 | B2 | 11/2005 | Fichou et al. |
| 7,002,926 | B1 | 2/2006 | Eneboe et al. |
| 7,020,654 | B1 | 3/2006 | Najmi |
| 7,065,041 | B2 | 6/2006 | Sen |
| 7,152,100 | B2 | 12/2006 | Thomas |
| 7,373,377 | B2 | 5/2008 | Altieri |
| 7,391,298 | B1 | 6/2008 | Campbell |
| 7,424,610 | B2 | 9/2008 | Ranganathan |
| 7,716,332 | B1 | 5/2010 | Topfl et al. |
| 2001/0023440 | A1* | 9/2001 | Franklin et al. ............ 709/226 |
| 2002/0124053 | A1 | 9/2002 | Adams et al. |
| 2002/0161832 | A1 | 10/2002 | Brebner |
| 2002/0165819 | A1 | 11/2002 | McKnight et al. |
| 2002/0176404 | A1* | 11/2002 | Girard ...................... 370/352 |
| 2002/0184451 | A1 | 12/2002 | Dovi |
| 2003/0005038 | A1* | 1/2003 | Codella et al. ............ 709/203 |
| 2003/0105734 | A1 | 6/2003 | Hitchen et al. |
| 2003/0187992 | A1* | 10/2003 | Steenfeldt et al. ......... 709/227 |
| 2003/0229623 | A1 | 12/2003 | Chang et al. |
| 2004/0008727 | A1 | 1/2004 | See et al. |
| 2004/0049537 | A1 | 3/2004 | Titmuss |
| 2004/0076160 | A1 | 4/2004 | Phaltankar |
| 2004/0098456 | A1 | 5/2004 | Kryzanowski et al. |
| 2004/0117476 | A1* | 6/2004 | Steele et al. ................ 709/224 |
| 2005/0033669 | A1 | 2/2005 | Stremler et al. |
| 2005/0138419 | A1 | 6/2005 | Gupta et al. |
| 2005/0192975 | A1 | 9/2005 | Reiner et al. |
| 2005/0238024 | A1 | 10/2005 | Taylor et al. |
| 2005/0262132 | A1 | 11/2005 | Morita et al. |
| 2005/0289234 | A1 | 12/2005 | Dai et al. |
| 2006/0020700 | A1 | 1/2006 | Qiu et al. |
| 2006/0031518 | A1 | 2/2006 | Jennings |
| 2006/0036904 | A1 | 2/2006 | Yang |
| 2006/0041606 | A1 | 2/2006 | Sawdon |
| 2006/0048224 | A1 | 3/2006 | Duncan et al. |
| 2006/0062161 | A1 | 3/2006 | Tang et al. |
| 2006/0123005 | A1 | 6/2006 | Burnett et al. |
| 2006/0190605 | A1* | 8/2006 | Franz et al. ................. 709/226 |
| 2006/0230165 | A1 | 10/2006 | Zimmer |
| 2007/0078858 | A1* | 4/2007 | Taylor et al. ................. 707/10 |
| 2007/0115123 | A1 | 5/2007 | Roberts et al. |
| 2007/0136572 | A1 | 6/2007 | Chen et al. |
| 2007/0245352 | A1* | 10/2007 | Ma ............................ 718/105 |
| 2008/0046552 | A1 | 2/2008 | Watson |
| 2008/0071922 | A1 | 3/2008 | Chetuparambil et al. |
| 2008/0082601 | A1 | 4/2008 | Meijer |
| 2008/0092181 | A1* | 4/2008 | Britt ............................ 725/87 |
| 2008/0147787 | A1* | 6/2008 | Wilkinson et al. ......... 709/203 |
| 2008/0162726 | A1 | 7/2008 | Hoover et al. |
| 2008/0229089 | A1 | 9/2008 | Assouad |
| 2008/0288609 | A1 | 11/2008 | Pramberger |
| 2008/0318589 | A1* | 12/2008 | Liu et al. .................... 455/453 |

FOREIGN PATENT DOCUMENTS

| | | | |
|---|---|---|---|
| EP | 1376309 | A2 | 1/2004 |
| EP | 1524580 | A2 | 4/2005 |
| EP | 1564622 | A2 | 8/2005 |
| JP | 2001282634 | A | 10/2001 |
| KR | 1020040038271 | A | 5/2004 |
| KR | 1020040107152 | A1 | 12/2004 |
| KR | 1020060057563 | A1 | 5/2006 |
| WO | WO0008814 | A1 | 2/2000 |
| WO | WO04002107 | A1 | 12/2003 |
| WO | WO2005116888 | A2 | 12/2005 |
| WO | 2005022826 | | 10/2006 |

OTHER PUBLICATIONS

Accessing Data across Subdomains http://www.tibco.com/devnet/resources/gi/3_4/accessing_data_across_subdomains34.pdf Last accessed on Nov. 27, 2008, 9 pages.

Provisioning Software http://www.business.com/directory/accounting/accounts_receivable_a_r/software/billing/provisioning_software/ Last accessed on Nov. 27, 2008, 3 pages.

Initializing using Remote Provisioning https://www.watchguard.com/help/lss/45/Reference/system10.htm. Last accessed on Nov. 27, 2008, 2 pages.

Brunner, et al. "Disruption Tolerant Networking" Dagstuhl Seminar Proceedings (2005) NEC Europe Ltd., Network Labooratories, 4 pages.

Fox, et al. "Towards Flexible Messaging for SOAP Based Services" (2004) IEEE, 11 pages.

Gunduz, et al. "A Framework for Aggregating Network Performance in Distributed Brokering Systems" (2000) Deptartment of Electrical Engineering & Computer Science, Syracuse University, 11 pages.

Chekuri, et al. "Building Edge-Failure Resilient Networks" (2002) Lucent Bell Labs, 18 pages.

Hota, et al. "Restoration of Virtual Private Networks with QoS Guarantees in the Pipe Model" (2004) GESTS International Transaction on Computer Science and Engineering, vol. 6 and No. 1, Journal ISSN No. 1738-6438, 12 pages.

Brightwell, et al. "Reserving Resilient Capacity in a Network" (2003) Networks 41, No. 2, 20 pages.

Duffield, et al. "A Flexible Model for Resource Management in Virtual Private Networks" (1999) ACM SIGCOMM Computer Communication Review vol. 29, Issue 4, 14 pages.

Create Buzz Marketing & Word of Mouth Marketing Campaigns. 2004-2005 Buzzoodle, A Liquid Learning Inc. Company. http://www.buzzoodle.com. Last accessed Sep. 20, 2006.

Seth Godin. Unleashing the Ideavirus. Do You Zoom, Inc., 2000.

James Surowiecki. The Wisdom of Crowds. Doubleday, 2004.

Sandhu, et al. Access Control: Principles and Practice. IEEE Communications Magazine, Sep. 1994.

System Management Concepts: Operating System and Devices, http://www.dlib.indiana.edu/doc_link/en_US/a_doc_lib/aixbman/admnconc/audit.htm. Last accessed Sep. 20, 2006.

Hughes, et al. Automated Verification of Access Control Policies. http://www.cs.ucsb.edu/~bultan/publications/tech-report04.pdf. Last accessed Sep. 20, 2006.

Cederquist, et al. An Audit Logic for Accountability. 2005. http://www.citebase.org/fulltext?format=application/pdf&identifier=oai:arXiv.org:cs/0502091. Last accessed Sep. 20, 2006.

Altiris: client & Mobile management, May 28, 2005, from archive.org, with link to data sheets (included) at http://web.archive.org/web/20050528093448/http://www.alitiris.com/products/clientmgmt/#doc.

Alan Joch, Options on Demand http: ladtmag.comlarticle.aspx?id=18693. Last accessed on Nov. 27, 2008, 5 pages.

VMware Announces the Next Generation of Virtualization—The Virtual Datacenter Operating System (VDC-OS), http: lwww.itreviewed.co.uk/article_print.php?id=6810. Last accessed on Nov. 27, 2008, 3 pages.

"What is cache?" A word definition from the Webopedia Computer Dictionary, retrieved on Jul. 10, 2011 at <<http://web.archive.org/web/20060926002508/http://www.webopedia.com/TERM/C/cache.html>>, 3 pages.

Office Action for U.S. Appl. No. 11/613,911, mailed on Mar. 1, 2012, Henricus Johannes Maria Meijer, "Remote Provisioning of Information Technology", 26 pgs.

* cited by examiner

REMOTE PROVISIONING OF INFORMATION TECHNOLOGY

CROSS-REFERENCE TO RELATED APPLICATION

This application is a continuation-in-part of U.S. patent application Ser. No. 11/536,578, filed Sep. 28, 2006 and entitled REMOTE PROVISIONING OF INFORMATION TECHNOLOGY, incorporated herein by reference.

BACKGROUND

Conventional information technology (IT) has primarily been localized and in large part central to corporate intranets. These intranets can provide a myriad of functions related to data storage and communication of information amongst organizational members. Corporate entities traditionally own various hardware and software licenses for supporting the intranet and use thereof. For example, one or more servers can be dedicated to particular tasks such as data storage/retrieval, data warehousing/analysis, electronic mail and backup. The intranet can also be composed of several client devices such as personal computers. Such devices include their own software applications for performing particular functionality such as network browsing, word processing and electronic mail management, among other things. The client devices can be connected via a wired and/or wireless network to local organization servers. These servers can also provide a gateway to wide area networks (WANs) such as the Internet.

Initial establishment of an organizational intranet can be an expensive and arduous process. A computer architecture is first defined based on organizational objectives and desired applications. Thereafter, appropriate equipment, namely hardware and software, is purchased and provided on premise. Hardware can include servers, routers, personal computers and the like. Software applications can be acquired for one or both of servers and client computers to provide functionality that facilitates one or more of database management, electronic mail, authoring/publishing, search, browsing, security and Internet access, among other things.

The hardware and software can be setup up by one or more consultants, designers and/or technicians. For example, organizational servers can be configured, computers connected thereto and software installed and configured on both the server and client computers to facilitate communication. Additionally, individual client computers can have additional software installed to support viewing, creating and/or interaction with disparate files and/or programs. Finally, security applications can also be installed on one or both of servers and clients to protect resources from malicious software as well as prevent unauthorized access to the system or particular data therein.

After an intranet is setup, continuous maintenance must be performed to keep the network operating properly. Larger organizations have on-site IT staff while smaller entities hire local IT specialists both of whom are charged with maintaining the intranet. Maintenance tasks can include diagnosing and correcting problems with the network and members of the network namely clients, servers and the like. Additionally, hardware and/or software upgrades or updates can be performed as a part of routine maintenance. Further yet, network computing devices may be added, removed or reconfigured for members as an organization changes. For example, if a company hires a new employee a computer needs to be acquired, loaded with appropriate software and configured for use by the employee on the network.

It should be noted and appreciated that internets or local IT networks are affected by various constraints not the least being a monetary budget. Accordingly, similar architectures are likely to vary noticeably in performance and capability. In fact, small and medium size enterprises often do not have the resources to establish and maintain networks of the caliber of large corporations. Moreover, some large enterprise resources are not available in scaled down versions. As a result, small and medium sized businesses are forced to operate with a competitive disadvantage in the modern computing era.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to remote provisioning of one or more IT networks and/or associated services. More particularly, rather than maintaining a myriad of similar resources locally, they can be provided remotely in a cloud. In accordance with one aspect of the innovation, resources can be pooled and apportioned to obtain a scale advantage that among other things reduces IT costs and provides superior service and performance. Furthermore, all entities, regardless of size, have the opportunity to access the same services.

According to one aspect of the subject disclosure, local computing devices can interact with a cloud-based IT service that manages resources in accordance with one or more entity subscriptions. The resources can be network accessible hardware and/or software (e.g., electronic data storage, processing power, cache, bandwidth, organizational and individual services/applications . . . ) located remote from a service client. Furthermore, the resources can be centrally located or distributed. The IT service provides resources to a client device in a cohesive manner such that it appears as if the resources (e.g., intranet, applications . . . ) are local.

The subject technology paradigm supports a plurality of interesting applications and/or optimizations. For example, according to one aspect, IT assistance and the expectation of expertise can be moved off-premise, for instance as an available network service. In accordance with another aspect, computation can be distributed between a client computing device and remote resources in a way that maximizes performance and/or throughput for one or more of the an individual user, a group of formally or informally related users, and the IT system as a whole. This can be based on the computational ability of a user device and availability of resources (e.g., remote or local).

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Provided herein are systems and methods for providing information technology (IT) in a "cloud." In other words, at least a portion of IT hardware and/or software can be moved off-premise and IT networks and/or associated services afforded as network service(s), for instance by third parties. This enables pooling of computer resources, which is advantageous in terms of both cost and performance, among other things.

The subject technology paradigm or architecture invites various other innovations. For instance, technical expertise can also be moved off-premise in addition to resources. Rather than requiring an onsite IT department, technical assistance can be accessed from a remote location, for instance by establishing a dialog (e.g., VoIP, SMS, video conferencing . . . ) with an IT professional and/or allowing him/her to take control of an individual client computer. A myriad of other services can also be provided including but not limited to brokering hardware and/or software, monitoring license compliance, monitoring user productivity, maintaining data and securing the network. Further yet, various schemes can be employed to optimized computation and user experience. For example, computation can be optimally distributed between off-premise resources and client devices.

An on-demand distribution model is also supported by the disclosed paradigm. In this case, entities can subscribe to a level of desired application and network performance. Shared resources including processing power, bandwidth, storage capabilities, cache and the like can be throttled in accordance with particular entity agreements. Thus, IT service can be more akin to a general-purpose utility (e.g., water, electricity . . . ) where monies paid are a function of use and level of service.

Still further yet, users or others can provision resources such as processing power and the like to off-premise services. For instance, off-premise services can purchase rights (e.g., auction) to use one or more resources such as those available with respect to client devices or other suppliers thereof.

Various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
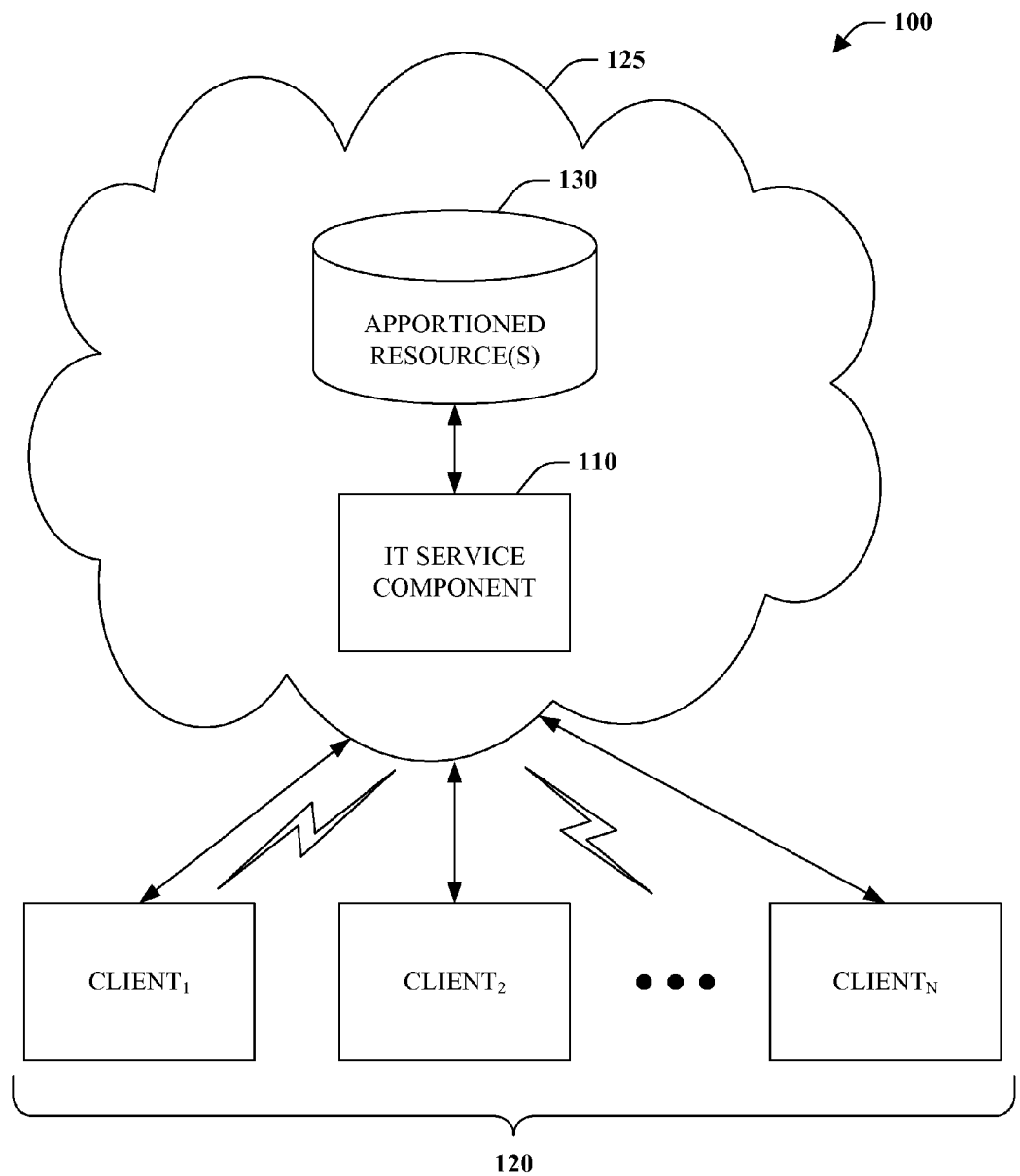
FIG. 1 is a block diagram of system that provides an off-premise IT network to an entity.

Referring initially to FIG. 1, a system 100 to provide IT networks to entities is depicted in accordance with an aspect of this disclosure. The system 100 includes an IT service component 110 communicatively coupled to one or more clients 120 ($CLIENT_1$, $CLIENT_2$ . . . $CLIENT_N$, where N is an integer greater than or equal to one) and one or more apportioned resources 130. The IT service component 110 and the apportioned resource(s) 130 are remotely located from the clients 120 off-premise in cloud 125. The cloud (as defined hereinafter) represents a plurality of network accessible resources. The Internet or portions thereof (e.g., Wide Area Networks, (WANs)) can be employed to facilitate coupling (e.g., wired, wireless . . .) of the clients 120 to the cloud 125 and more specifically IT service component 110. Furthermore, it should be appreciated that while the IT service component 110 and apportioned resource(s) 130 can be local to one another for example as part of the same server system or data center, they can also be remotely distributed.

Clients 120 correspond to individual users or groups of users desiring to receive IT network service. A client 120 can be a computing device (e.g., P.C., mobile phone, personal digital assistant (PDA) . . . ) associated with one or more users, for instance by ownership or use. In one instance, the clients 120, or a portion thereof, can be representative of an entity comprising one or more users either formally or informally related. For example, an organization or enterprise can be referred to as an entity including a plurality of users, namely members or employees. Each member or employee computer can hence be a client 120. Such entity computers can be local to or remote from one another. Still further yet, it should be appreciated that one or more clients 120 form part of the cloud 125 to facilitate communication and data processing, inter alia.

Apportioned resource(s) 130 represents one or more hardware and/or software resources shared amongst one or more clients 120. For example, one resource can be a data store of which portions are dedicated to particular entities. The resource(s) 130 can also refer to other hardware including but not limited to processors, cache, and network equipment. Similarly, software and/or services can be apportioned resources 130. At least a portion of the resources 130 can be centrally located or distributed across the cloud 125 or multiple clouds.

The IT service component 110 affords an IT network and/or associated services to clients 120. More specifically, the IT service component 110 can manage the apportioned resources 130 in a manner to establish, maintain and/or upgrade one or more entity IT networks. Entity client(s) 120 can interact with this IT network via the IT service component 110. Among other things, the IT service component 110 provides a cohesive user experience across a plurality of disparate apportioned resources 130 comprising an IT network and/or associated services while also controlling interaction to preserve privacy and respect subscriptions or like agreements.

By way of example and not limitation, rather than maintaining a local network including on-premises servers and associated software, a company can choose to subscribe to the subject IT service. The subscription can provide for electronic data storage, processing, communication bandwidth, and required software, inter alia. For instance, the subscription can provide for establishment of a company website and management of electronic mail with the same domain name. Further, particular application software can be provided for use by particular company employees. Employees can then utilize a local company computer or other computing device to access and interact with the IT service. For example, an employee can create a word processing document using an online or cloud word processor and save the document to the company's designated portion of the data store. Likewise, the IT service can aid a user in accessing their email by providing access to an online email management application.

An interesting effect of the subject paradigm is the inherent support for both legacy and new technologies. In order for users to adopt a new technology, they must either endure great pain or it must be easy for them to switch to using the new technology. As products evolve, a danger is that it is the products become good enough (i.e., customer pain is more or less addressed) and users will not want to go through the trouble of switching to newer technology (e.g., converting files, reinstalling software . . . ). Among other things, remote provisioning of information technology via the IT service component 110 enables users to adopt new technologies that solve a specific pain without having to buy into a completely new environment. Users can add just specific services or functionality that they need. Further, since users do not need to administer their own machines and data, migration becomes much easier. As a result, it is possible to continue running legacy applications in parallel with newer ones.

Figure 2:
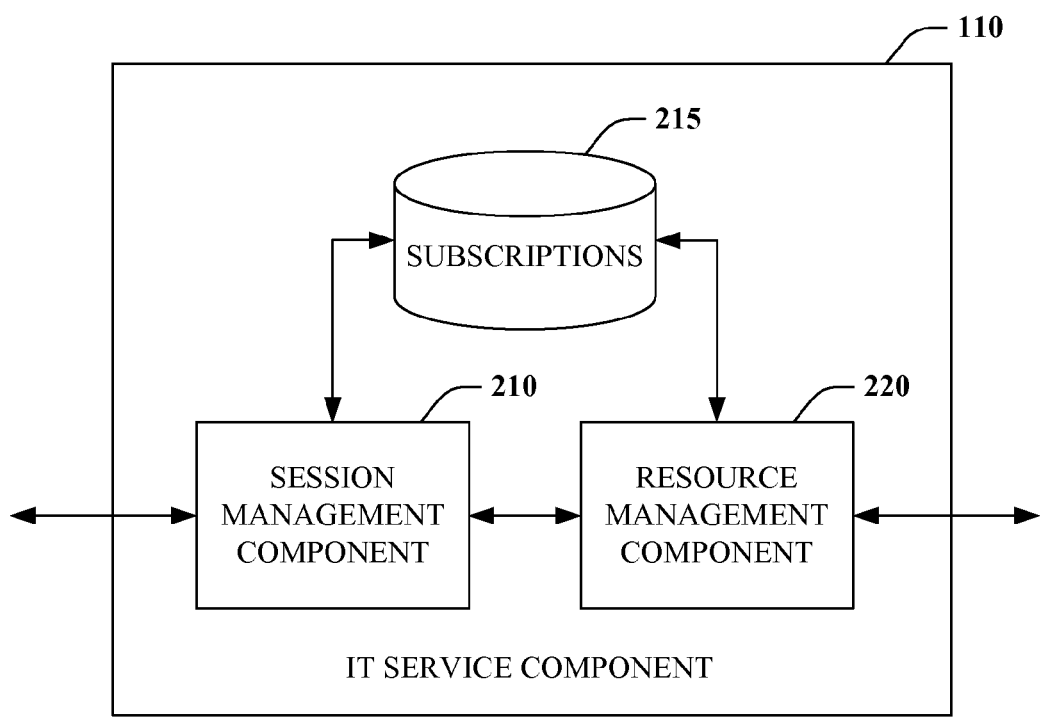
FIG. 2 is a block diagram of a representative IT service component.

Turning attention to FIG. 2, a representative IT service component 110 is depicted in accordance with an aspect of the provided disclosure. As previously described, the IT service component 110 affords IT networks and associated services remotely. The IT service component 110 includes session management component 210, resource management component 220 and subscription store 215, as shown. The session management component 210 controls establishment and maintenance one or more client sessions. A session can be established and maintained in accordance with an entity subscription, for instance located and accessible via the communicatively coupled subscription store 215. By way of example, the session management component 210 can facilitate identification of a user and employment of proper communication protocol based on subscription information. An established session acts as a pipe for receiving information from and/or providing information to a specific user or user device. The session management component 210 is communicatively coupled to the resource management component 220. This enables users to access, employ or otherwise interact with remote computer resources. More specifically, the resource management component 220 is operable to provide restricted and/or controlled access to resources based on a subscription associated with the user and located for reference in communicatively coupled subscription store 215. For instance, a subscription can designate particular applications a user is able to employ and/or the manner in which a user can utilize such applications. The session management component 210 and the resource management will now be described in further detail to facilitate clarity and understanding.

Figure 3:
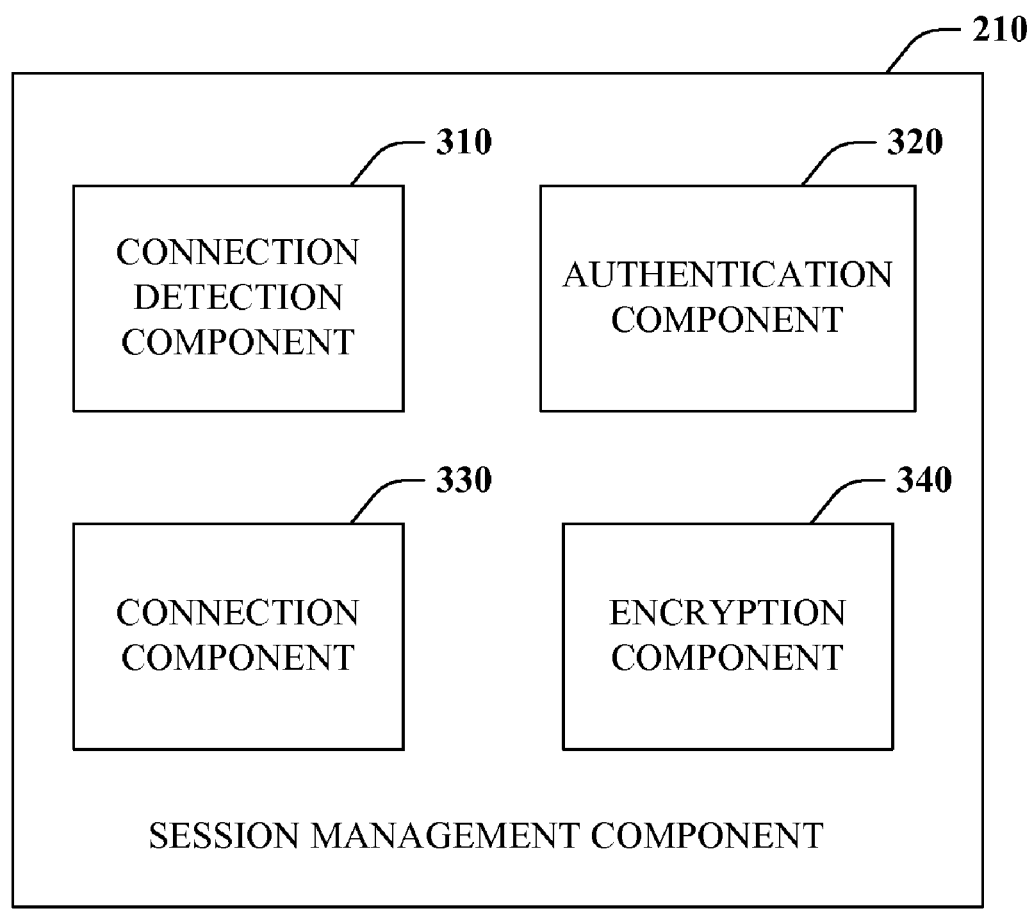
FIG. 3 is a block diagram of a representative session management component.

FIG. 3 illustrates a representative session management component 210 in further detail. The session management component 210 includes connection detection component 310, authentication component 320, connection component 330 and encryption component 340. The connection detection component 310 can monitor a communication channel, port, address or the like for activity, namely an attempted service connection/login. Upon detection of such a connection authentication can be initiated via authentication component 320.

The authentication component 320 is operable to identify a user and/or user device based on one or more techniques. Such techniques should not be tied to a particular machine to enable users to employ various public and private devices without limitation. However, aspects of the disclosure are not limited thereto. For instance, the authentication component 320 can simply validate a provided user name and password. Additionally or alternatively, biometrics can be employed for example to identify unique physical and behavioral characteristics associated with a user including, without limitation, finger, hand, voice, face, retina and/or typing pattern recognition, amongst others. As can be appreciated, a variety of other tools can also be employed to facilitate authentication including, without limitation, input from third parties (e.g., certifying group, social network . . . ), reputation and alternate identities. Once a user and/or device is authenticated, the component 330 can establish and maintain a connection or session with a user device over which data can be transmitted back and forth.

The encryption component 340 can be utilized by the connection component 330 to encrypt and/or decrypt communications in accordance with one or more encryption schemes (e.g., public key cryptography, secure sockets layer (SSL) and transport layer security (TLS) . . . ). Furthermore, it should be appreciated that the encryption component 330 can be utilized alone or in conjunction with the authentication component 320. For instance, where protocols are employed that support both authentication and encryption, the combination of components can be employed to facilitate user identification and secure communication. Accordingly, an initial communication contact may be encrypted such that encryption component 340 is needed to decrypt and/or aid authentication.

Figure 4:
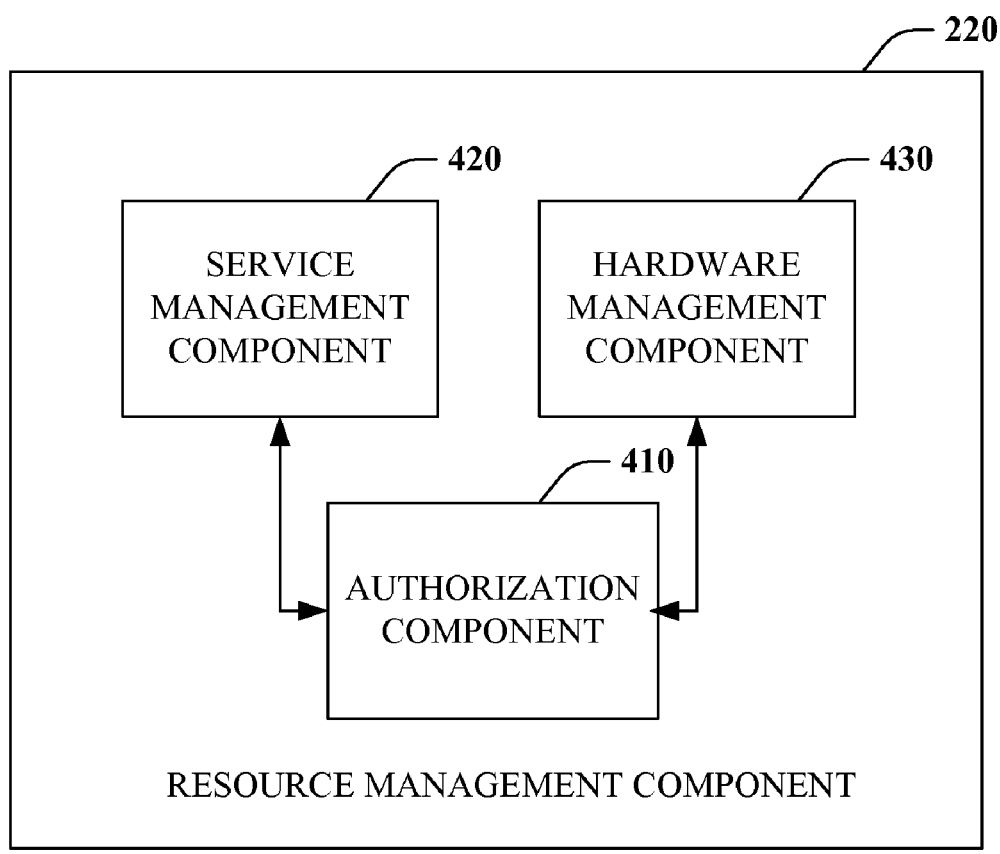
FIG. 4 is a block diagram of a representative resource management component.

FIG. 4 depicts a resource management component 220 in further detail in accordance with an aspect of this disclosure. As previously described, the provided system can support a plurality of entities including one or more users. The resource management component 220 distributes resources or allows access to resources based on a formal or informal agreement or subscription. The management component 220 can include an authorization component 410 to ensure proper distribution of resources. More specifically, the authorization component 410 can receive retrieve or otherwise obtain or acquire authentication data from the session management component 210 (FIGS. 2 & 3) and subscription information from store 215 (FIG. 2). Based at least thereon, the authorization component 410 can determine a level of service or access associated with an authenticated user and provide (or make accessible) such information to service management component 410 and/or hardware management component 420.

The service management component 420 manages access to services or applications. Component 420 and can interact with the authorization component 410 to determine accessible services based on an authenticated identity and associated subscription. For instance, a subscription can indicate that an entity can access and employ particular software applications. Furthermore, the component 410 can enforce other constrains such as a number of times or time period over which software can be employed. Similarly, the software management component 410 may restrict provisioning of certain applications in accordance with a subscription and/or license. Component 410 thus acts as a service gatekeeper controlling who and how software can be utilized, inter alia.

The hardware management component 430 manages access to hardware resources based on provided authorization information. Such resource can include but are not limited to electronic storage, processing power, memory or cache and communication bandwidth. Among other things, resources can be controlled based on a formal or informal agreement such as subscription and/or the availability of particular resources. The simplest example pertains to electronic storage. For instance, an entity can subscribe to a particular amount or size of storage (e.g., 50 GB, 10 TB . . . ). While resources can be discretely divided, more efficient manners of use can be employed. By way of example and not limitation, a subscription can define levels of service wherein higher levels receive priority over lower levels. Processing power could be divided in this manner such that transactions associated with certain subscriptions are executed prior to transactions associated with other subscriptions. Further yet, resources can be distributed and utilized in a manner that optimizes performance for one or more of at least one entity and the system itself. For instance, the hardware management component 430 can determine or infer context information such as relative processing speed of transactions and current/predicted resource usage, amongst others, and adjust the processing schedule to maximize system throughput.

Figure 5:
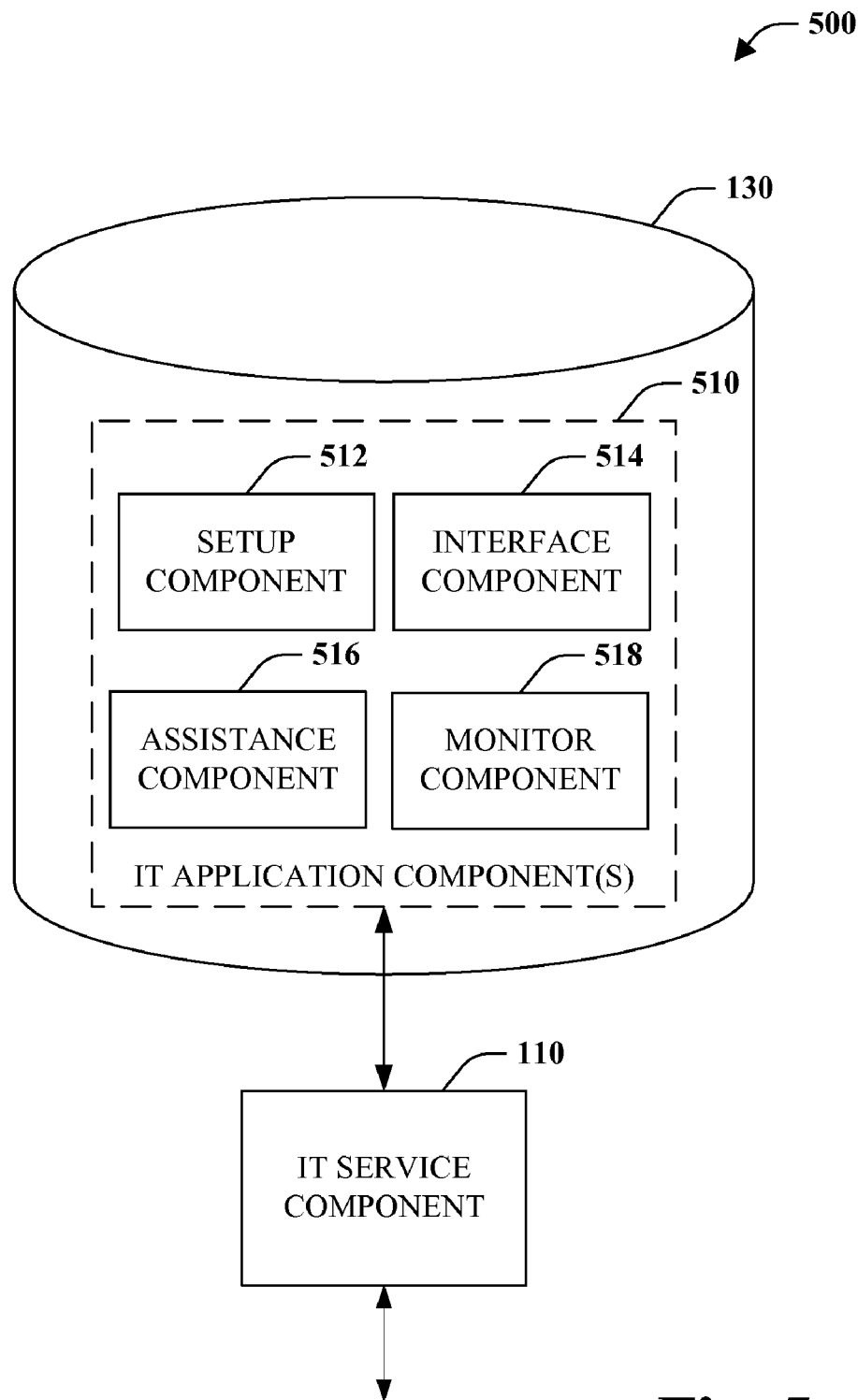
FIG. 5 is a block diagram of a remote IT network system that employs a plurality of IT applications.

Referring to FIG. 5, a remote IT network system 500 is illustrated in accordance with an aspect of the disclosure. System 500 includes the IT service component 110 and apportioned computer resources 130, as previously described. In brief, the IT service component 110 provides IT networks and/or associated services to one or more entities via employment of apportioned computer resources 130. One of those resources can be various IT software applications or services, identified as IT application component(s) 510. It will be appreciated that numerous applications could be classified as IT applications or services including many popular office (e.g., word processing, spreadsheet, database . . . ) and entertainment (e.g., audio/video players, games . . . ) applications as well as many other services or applications that are conventionally associated with personal computers and/or local servers. Presented hereinafter is a subset of IT applications that are particularly useful within the context of the subject architecture. More specifically, system 500 can include a setup component 512, interface component 514, assistance component 516 and monitor component 518.

The setup component 512 provides functionality to enable an entity network to be configured for one or more users. In particular, network policies/rules can be set and roles, permissions and/or settings established for users. At least a portion of such settings can be provided by default and/or inferred from other information. Other information can be provided through interaction with one or more graphical user interfaces (GUIs) (e.g., wizard . . . ) and/or uploaded or downloaded from a data store (e.g., database, cloud service, jump drive . . . ). By way of example, if a company subscribes to a package of IT applications, a local administrator (e.g., technician, owner, user . . . ) can employ the setup component 512 to configure a network for the company.

As will be appreciated, network setup can be accomplished much faster than through use of conventional mechanisms. Consider an organization with many users. Conventionally, an IT administrator would have to physically install and configure applications on every desktop. For example, software disks for a particular device need to be located, loaded on to the device and configured for particular users. Utilizing the setup component 510 this can be accomplished more expeditiously by designating applications to be accessible by particular users based on provided identities and configuring a network remotely from a single location. The setup component 510 can also make it easy to configure multiple users by allowing easy replication of settings. Once configured, all a user needs to do is connect a device (e.g., wired or wireless) to the network. Furthermore, the act of connecting to the network can initiate the setup processes. A user can then personalize a device, for instance utilizing a wizard or other application and have his/her settings saved and employed with respect to subsequent login and interaction, regardless of the device.

The interface component 514 can provide a user view of the remotely established network. Icons, menus and/or other navigational mechanisms can be provided by the interface component 514 to allow a user to interact with resources such as other software applications. This can be accomplished by providing links to external resources. The interface component 514 can thereby provide a single view of remote resources accessible by a user. In one embodiment, this view can be similar to those provided by conventional operating systems except that remote resources appear as if they were local.

The assistance component 516 can facilitate affording technical assistance or help regarding a network. Rather than or in addition to consulting on-site, the assistance component 516 can provide users a mechanism to initiate remote assistance. In one instance, the assistance component 516 can initiate a communication session (e.g., voice, video, VoIP, text messaging . . . ) between a user and a remote technician. For example, an icon can be present on a graphical user interface selection of which initiates a session. The technician can then provide desired information and/or help resolve a user IT problem. For instance, a remote instance of an application may need to be reset or upgraded. The assistance component 516 can also provide a technician access to the remote system and/or local computer. The technician can thus take control a local computer or computing device to facilitate troubleshooting with respect to network interaction as well as make changes at either the local or remote ends. Still further yet, the assistance component 516 can interact with local help. For example, the component 516 can loop in a local administrator to authorize one or more transactions for a user. More specifically, if an upgrade needs to be made to accessible software requiring an additional licensing fee, then a local administrator may be contacted to approve such an action and/or provide payment therefor.

The monitor component 518 can monitor network interaction. The monitor component 518 can observe and/or record entity network interactions to facilitate various determinations including but not limited to employee productivity. In other words, the monitor component 518 can examine organizational network interaction and discriminate between work related and personal use. For instance, the monitor component 518 can determine time spent working on a computer versus surfing the Web and/or the frequency of business versus personal emails, among other things. Furthermore, determinations can be made at various levels of granularity such as per user, department, company, subscription etc. This can be accomplished through pattern recognition and/or user action alone or in combination with various context information (e.g., user, item, third party, current events . . . ), among other things. For example, based on the context of an email or text message communications, with a particular individual can be deemed personal or business and tracked accordingly. Further yet, a user may categorize or tag communications and/or work items in such a manner that lends itself to interpretation and monitoring (e.g., personal, business, weekend, Janet's Wedding, fantasy football . . . ). Statistics associated with users can then be aggregated based on group associations to produce information that is more granular. Entities can use this data glean information about productivity amongst groups and the effect of particular events, inter alia.

Figure 6:
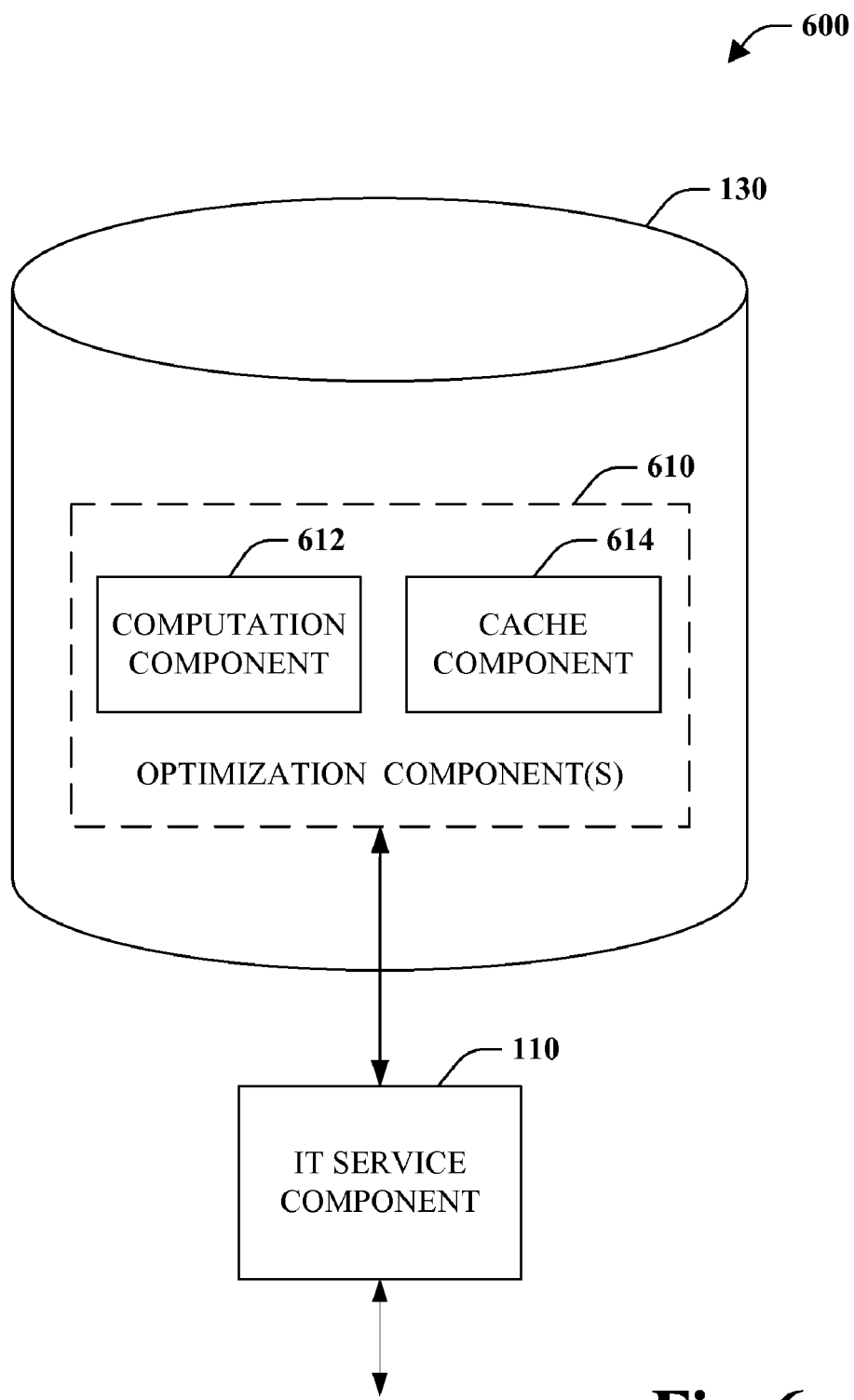
FIG. 6 is a block diagram of a remote IT network system with optimization components.

In addition to user applications, apportioned resources 130 can include optimization mechanisms. Turning attention to FIG. 6, a system 600 is illustrated in accordance with an aspect of the disclosure. The system 600, similar to system 500, includes the IT service component 110 and apportioned resources 130. In brief and as previously described, the IT service component 110 can manage interaction with one or more apportioned resources 130. Here, apportioned resources 130 are illustrated including optimization components 610. Optimization components 610 are operable to improve performance, inter alia, with respect to interaction between users and cloud services such as providing one or more off-premise IT networks. Although not limited thereto, two specific optimization components are illustrated for purposes of clarity and understanding, namely computation component 612 and cache component 614.

Figure 7:
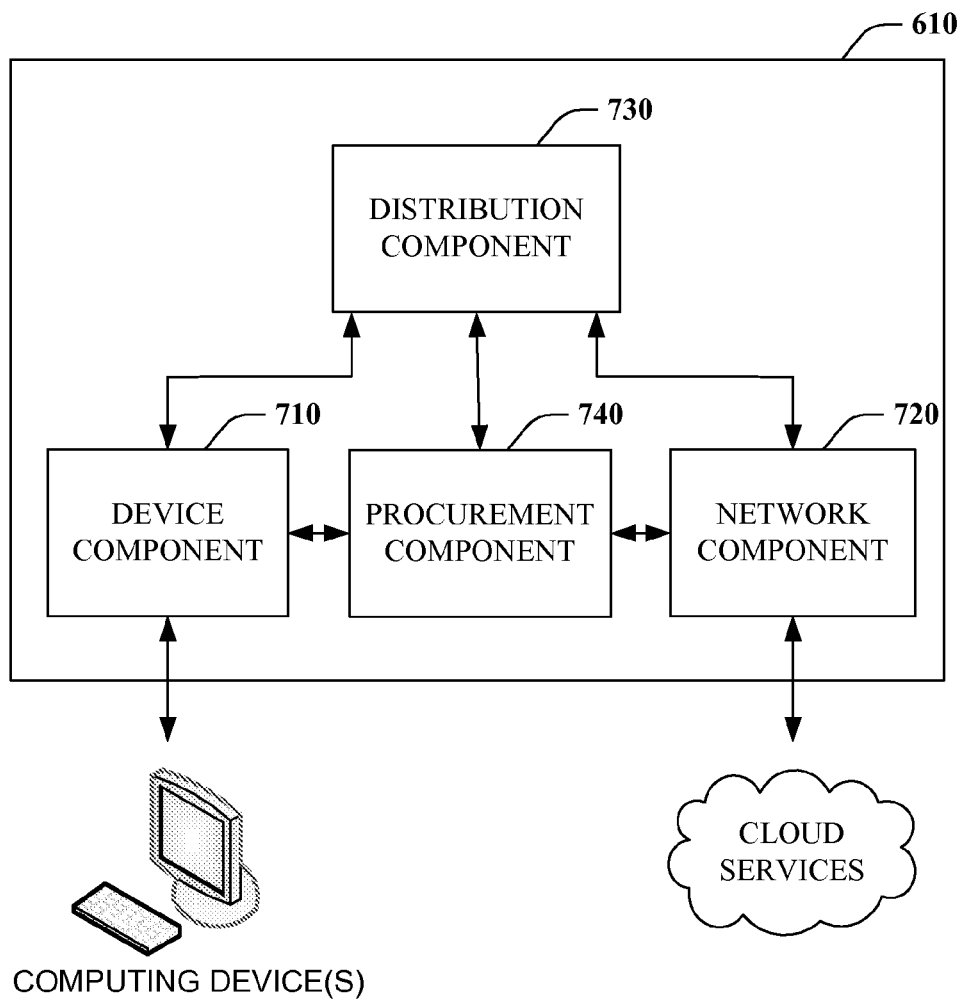
FIG. 7 is a block diagram of a representative computation component.

In furtherance of description, FIG. 7 is supplied depicting the computation component 612 in additional detail. The component 612 facilitates optimized distributive computation. Computing devices (e.g., thin client, workstation, P.C., mobile . . . ) include disparate computing power. Further, an entity can subscribe or otherwise contract for varying levels of IT service. The computation component 612 can distribute computation between device and service to optimize performance or throughput for one or more of the device and the service. As illustrated, the computation component 612 can include a device component 710. Device component 710 can retrieve, receive or otherwise obtain information pertaining to device resources and/or usage thereof. Similarly, the network component 720 can retrieve, receive or otherwise acquire information about available resources, an associated subscription or the like. Distribution component 730 can obtain information from one or both of the device component 710 and the network component 720 and determine and/or facilitate optimal computational distribution.

By way of example, if it is known or determined that a communicating device is a thin client (e.g., terminal, mobile device . . . ), then most, if not all, computation can be done by the service. The device can then be fed or piped solely presentation data for display and interaction with a user. Alternatively, if a device has significant available resources, computation can be split between the device and the service in a manner that optimizes performance.

Resources can be designed to support such division. For example, a device can include all or partial versions of software to support split or parallel computation between local and external resources. Additionally or alternatively, the distribution component 730 can coordinate processing between device and service. In one instance, the distribution component 730 can employ device hardware resources as if they were local to facilitate improved performance for one or both of the device and service.

Further yet, while computation distribution can be predetermined prior to execution based on the availability of resources, distribution can be even more flexible. The computation component 612 can support real-time adjustability. In other words, resources can be monitored during runtime and computation moved on the fly. For instance, if computation is initially split between a user device and the service, the computational division can be monitored and adjusted in real-time to compensate for changing workloads and/or communication latency, among other things. Still further, distribution determinations whether initial or on the fly can be based on inferences or predictions regarding resource usage and/or allocation. Accordingly, preemptive adjustments can be made to optimize performance, for example based on historical data regarding resource usage.

Still further yet, it should be noted that the optimization component 610 can also be employed to support the cloud and services thereof. More particularly, if user resources such as processing power are not being employed distribution component 730 can make them accessible for use by the cloud to take advantage of all resources and optimize performance amongst them. In one instance, rights thereto can be purchased or otherwise obtained via the procurement component 740. The procurement component 740 can thus broker a deal between client devices and the cloud or cloud services utilizing communicatively coupled components 710 and 720, respectively. Once a deal is established, the distribution component 730 can be notified and operate to provision resources in accordance with the deal. Although not limited thereto, the procurement component 740 can operate an auction of resources, whereby services can bid on resources and/or users can offer such resources for sale and the lowest bids located by the service. Users can provide services with one or more disparate resources such as processing power, disk space and graphics cards, among other things. Further yet, procurement can operate with respect to subscriptions to services such that license or contract terms can be adjusted for provided resources or the like. This is advantageous to cloud service providers as they can maintain fewer machines and instead broker between consumers and/or suppliers of resources. Still further yet, it should be noted that making resources such as processing power available to the cloud or services thereof can have various security implications. Possible solutions are addressed in several of the related applications.

Returning to FIG. 6, another optimization can be performed by the cache component 614. In particular, component 614 can support various caching schemes to improve performance. For example, smart or predictive caching can be employed by a remote service to facilitate expeditious processing. These cache techniques can be applied to one or more entities and/or users. Consider applicability to organizational IT. Data frequently accessed by members of the organization can be cached to expedite access thereto. Additionally, predictions can be employed wherein the likelihood that data will be employed given access to other data is utilized to determine data to cache. Among other things, this can be employed on an entity basis and/or across entities to optimize performance of provided services and/or the system as a whole. Further yet, the caching component 614 can be utilized in partially connected scenarios. In this manner, users can continue to work locally even when disconnected from the cloud.

Figure 8:
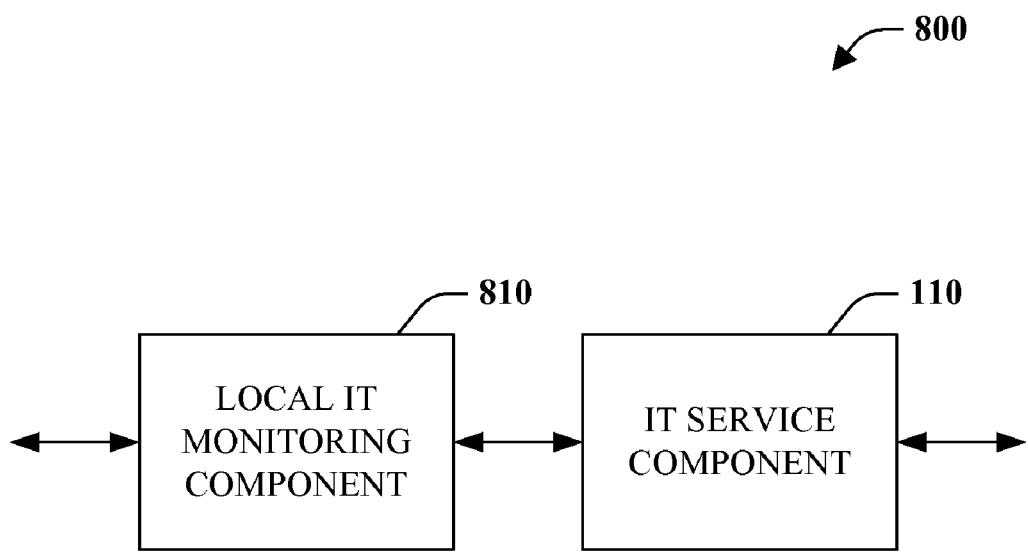
FIG. 8 is a block diagram of a supplementary IT service system.

Referring to FIG. 8, a system 800 is illustrated for supplementing an IT network. Users may prefer at least initially to maintain a local IT network, but desire improvements thereto. Accordingly, a combination of remotely provisioned resources and conventional on-site IT services can be supported. As illustrated, the system can include an IT service component 110 as previously described as well as a local IT monitoring component 810. The local IT monitoring component can monitor a local IT network and information about the local network to the IT service component 110. The IT service component can subsequently provision remote off-premise or third party resources to supplement and/or augment a conventional local network. In one instance users can subscribe to a particular level of network service and/or performance and they system 800 can maintain such level via use of third party resources. By way of example, a convention server can be mirrored by the IT service component to provide disaster recovery relief, for instance if a local server failure occurs the IT service component 110 can seamlessly direct data requests to the mirrored store. In another instance, communication bandwidth, processing power, local storage or the like can be supplemented by the IT service component 110.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the IT service component 110 can employ machine learning to facilitate a myriad of tasks such as distributive computation and predicative caching. More specifically such mechanism can learn and subsequently make inferences or predictions that can be relied upon with respect to distribution of computations amongst resources and/or caching of information.

In view of the exemplary systems described supra, methodologies that may be implemented in accordance with the disclosed subject matter will be better appreciated with reference to the flow charts of FIGS. 9-12. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 9:
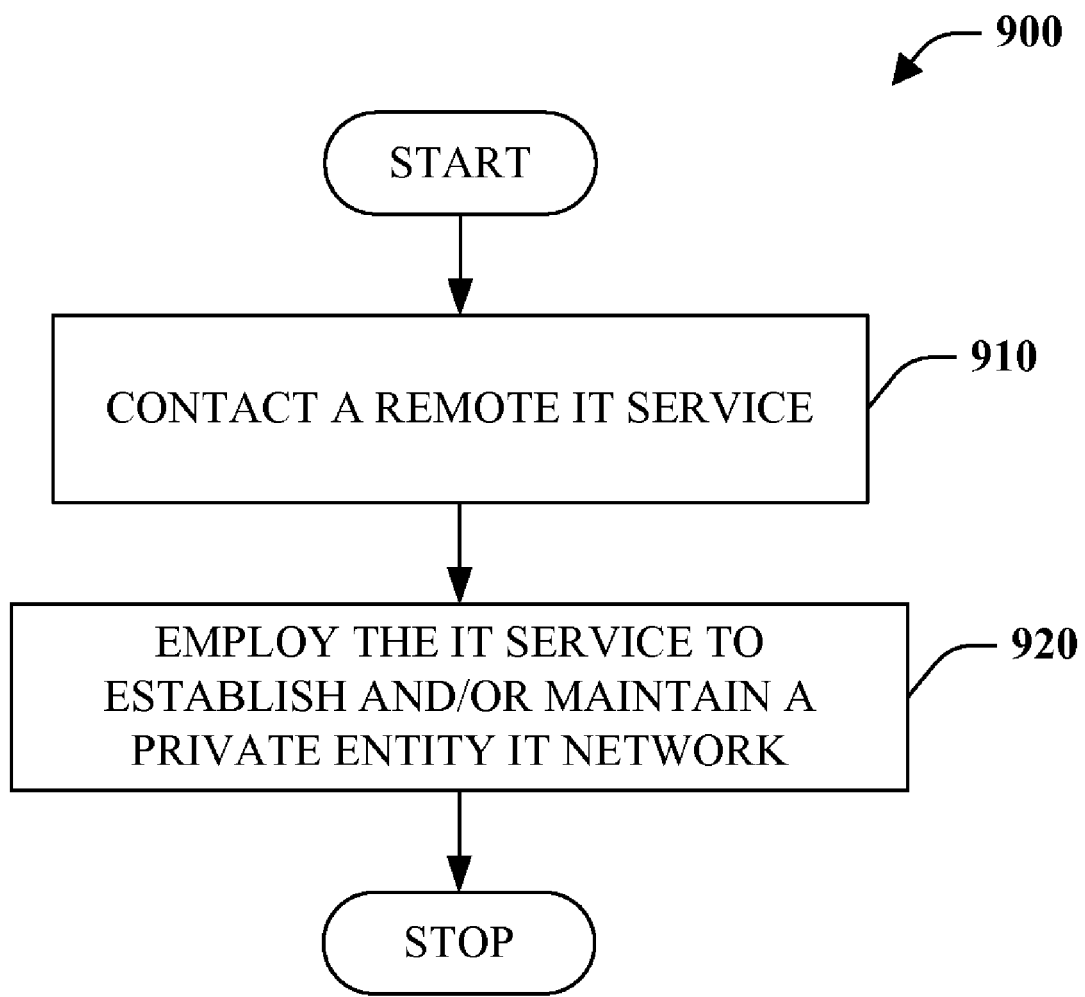
FIG. 9 is a flow chart diagram of method of employing remote IT services.

Referring to FIG. 9, a method 900 of remote IT service employment is illustrated in accordance with an aspect of the disclosure. At reference numeral 910, a remote IT service is contacted. In one instance, contacting a service can involve subscribing to one or more network services. The subscription can be fee or non-fee based and services dependant thereon. For instance, services can be provided base on a flat fee monthly basis or even on a pay as you go basis (e.g., hourly, daily . . . ). Accordingly, It service can be provided in a manner similar to conventional public utilities (e.g., water, gas, electric, cable . . . ). Services can include, without limitation, software applications (e.g., word, processing, email, spreadsheet, ERP, CRM . . . ), data storage, processing power, communication bandwidth and any other service typically associated with local on-premise networks. At numeral 920, the service is employed to establish and/or maintain a private entity IT network. For example, rather than setting up a local network including one or more servers, workstations, and associated applications as is the convention, a company can subscribe to a set and/or level of IT services to be provided remotely. The company can subscribe to a package that provides a unit of data storage for housing company data, access to particular software applications, a level of processing power and a communication bandwidth. Hence, entities are able to offload in-house IT services to an IT service (e.g., third party) that remotely maintains the entities' respective networks.

Figure 10:
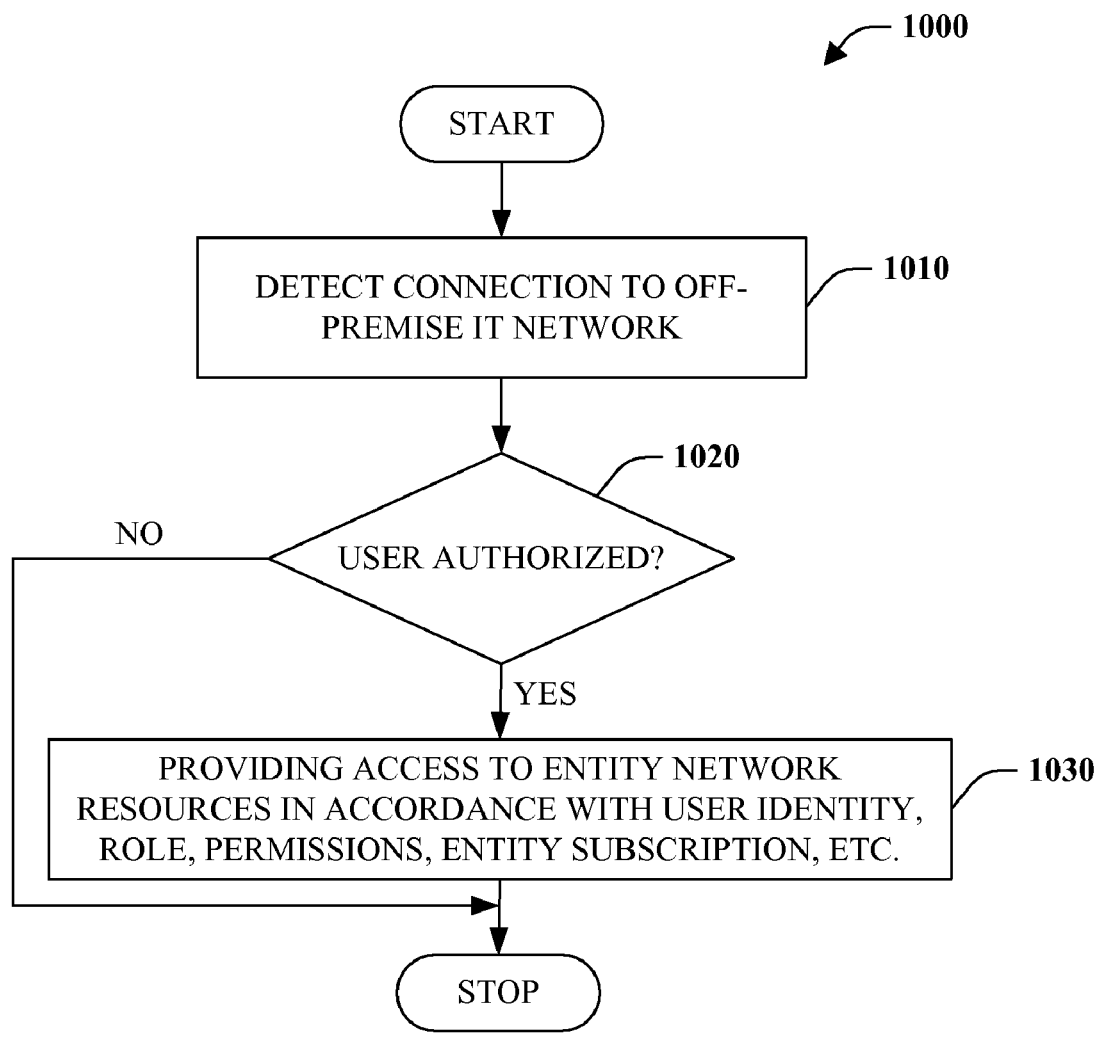
FIG. 10 is a flow chart diagram of method of affording remote IT services.

FIG. 10 depicts a method 1000 of providing IT network services in accordance with an innovative aspect. At reference numeral 1010, connection or attempted connection to a remote IT network is detected. This can correspond to an entity device attempting to access IT services. At numeral 1020, a determination is made as to whether the device and/or user is authorized to access the remote IT network. This can be done by receiving and/or retrieving particular information and attempting to match this with initially provided identifying information. In accordance with one aspect, the system can be user or identity centric rather than device centric, although it is not limited thereto. As a result, the determination can attempt to identify a particular user via one or more authentication/authorization mechanisms. To this end, a simple user name and password can be employed alone or in combination with biometrics (e.g., recognition of voice, retina, iris, fingerprint, palm print, typing patterns . . . ) and other identification mechanisms (e.g., smart card . . . ). If the user fails to authenticate, the method can simply terminate, as the user is not entitled to receive service. If authentication is successful, the method proceeds to reference 1030 wherein access is provided to the network and associated resources. Access can be controlled or restricted based on user role, permissions, associated entity subscription and/or the like. In this manner, levels of access can be maintained in accordance with subscriptions. Moreover, entity resources can remain separate and private such that a first entity cannot access a second entity's resources.

Figure 11:
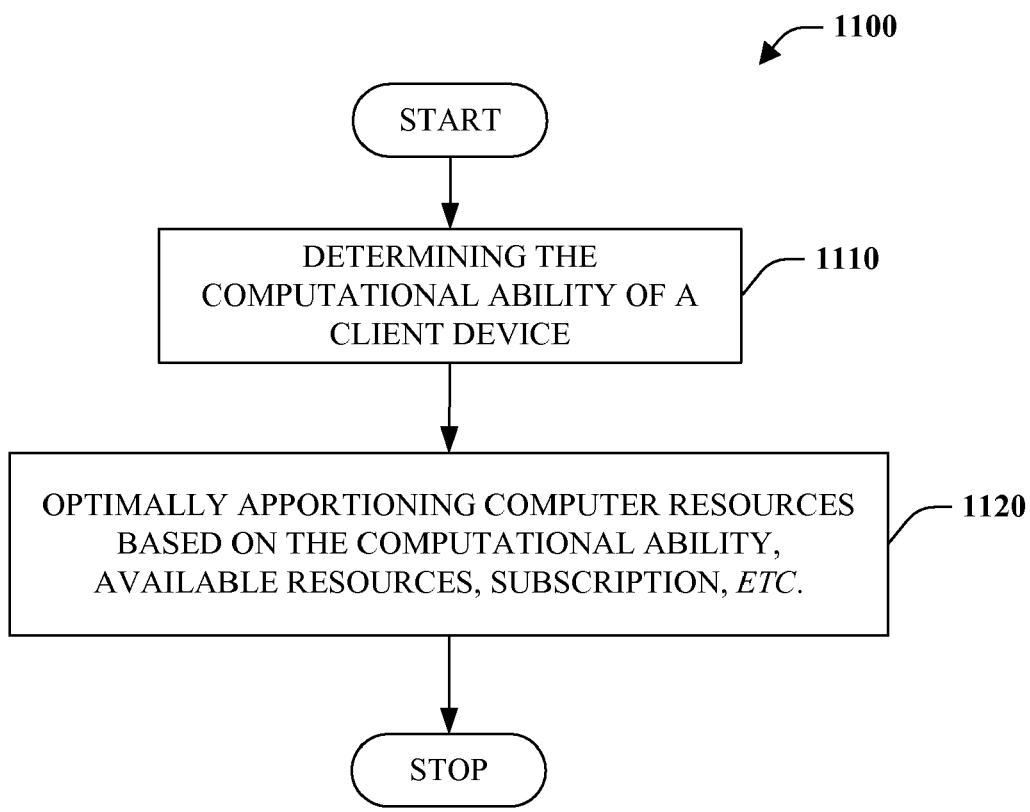
FIG. 11 is a flow chart diagram of a method of resource allocation.

FIG. 11 depicts a method 1100 of allocating resources in accordance with an aspect of the disclosure. While resources such as applications or services can be executed solely remotely or locally, the resources may also be distributed across both means. At numeral 1110, computational ability of a client-computing device is determined. For example, the type and speed of the processor, cache, local software and the like are ascertained. Service resources are apportioned optimally based on a plurality of factors, at reference numeral 1120, including but not limited to the computational ability of the client, service subscription and available resources. Available resources can refer to those of the service and/or the client device. Furthermore, resources can be reapportioned or adjusted in real time to account for changes computational loads and resource availability. Further yet, inferences can be made with respect to resource availability and alterations made to computational distribution to optimize performance.

Figure 12:
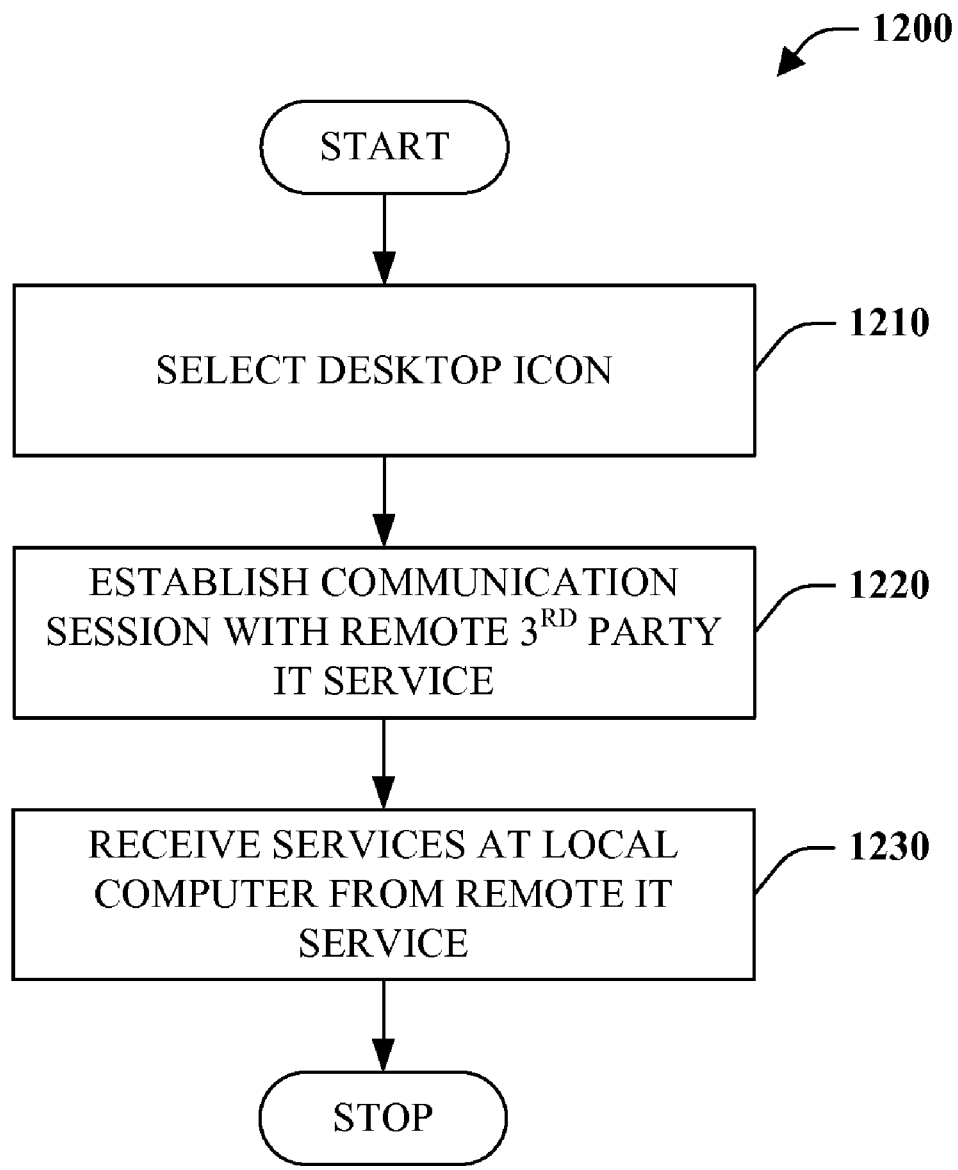
FIG. 12 is a flow chart diagram of a method of providing network assistance.

FIG. 12 illustrates a method 1200 of providing network assistance in accordance with an aspect of the disclosure. Network assistance and expertise can be moved to the center, namely as a cloud service, rather than relying solely on local help. At reference numeral 1210, a desktop icon associated with help is selected by a user. A communication session is subsequently established with a remote IT service at numeral 1220. For example, a VoIP, text message or video conference session can be initiated to enable dialog between a user and an off-premise technician. Services can then be provided and received from the remote service at the local computing device. The services can be instructions to perform such actions for example to fix some problem. Additionally or alternatively, the service can take control of the local computer to perform some action such as diagnosis a problem and provide a solution. It should be appreciated that some actions can also be preformed remotely, for example upgrading an application, installing a patch or the like.

As used herein, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The term "entity" is intended to include one or more individuals/users. These users may be associated formally or informally, for instance as a member of a group, organization or enterprise. Alternatively, entities and/or users can be completely unrelated.

A "cloud" is intended to refer to a collection of resources (e.g., hardware and/or software) provided and maintained by an off-site party (e.g., third party), wherein the collection of resources can be accessed by an identified user over a network (e.g., Internet, WAN . . . ). The resources provide services including, without limitation, data storage services, word processing services, and many other services or applications that are conventionally associated with personal computers and/or local servers.

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 13:
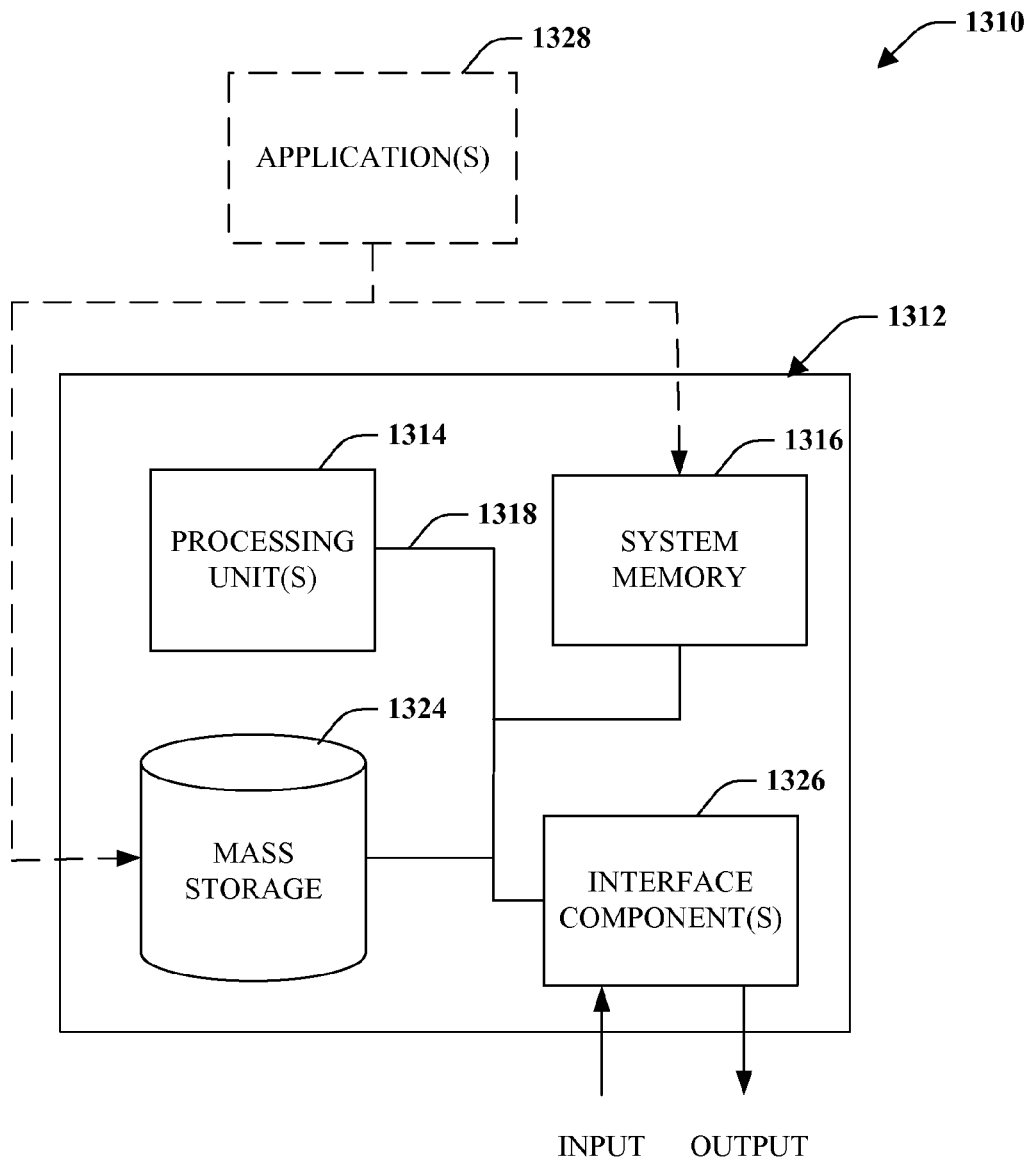
FIG. 13 is a schematic block diagram illustrating a suitable operating environment for aspects of the subject innovation.
Figure 14:
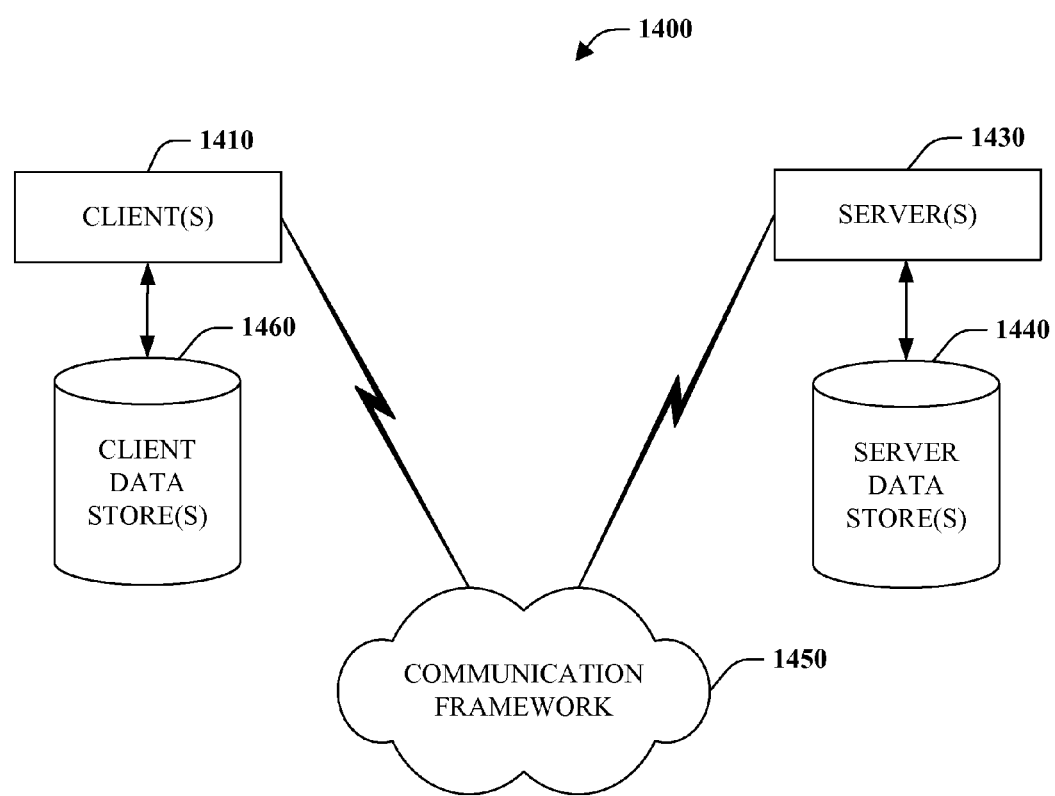
FIG. 14 is a schematic block diagram of a sample-computing environment.

In order to provide a context for the various aspects of the disclosed subject matter, FIGS. 13 and 14 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 13, an exemplary environment 1310 for implementing various aspects disclosed herein includes a computer 1312 (e.g., desktop, laptop, server, hand held, programmable consumer or industrial electronics . . . ). The computer 1312 includes a processing unit 1314, a system memory 1316, and a system bus 1318. The system bus 1318 couples system components including, but not limited to, the system memory 1316 to the processing unit 1314. The processing unit 1314 can be any of various available microprocessors. It is to be appreciated that dual microprocessors, multi-core and other multiprocessor architectures can be employed as the processing unit 1314.

The system memory 1316 includes volatile and nonvolatile memory. The basic input/output system (BIOS), containing the basic routines to transfer information between elements within the computer 1312, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1312 also includes removable/non-removable, volatile/non-volatile computer storage media. FIG. 13 illustrates, for example, mass storage 1324. Mass storage 1324 includes, but is not limited to, devices like a magnetic or optical disk drive, floppy disk drive, flash memory or memory stick. In addition, mass storage 1324 can include storage media separately or in combination with other storage media.

FIG. 13 provides software application(s) 1328 that act as an intermediary between users and/or other computers and the basic computer resources described in suitable operating environment 1310. Such software application(s) 1328 include one or both of system and application software. System software can include an operating system, which can be stored on mass storage 1324, that acts to control and allocate resources of the computer system 1312. Application software takes advantage of the management of resources by system software through program modules and data stored on either or both of system memory 1316 and mass storage 1324.

The computer 1312 also includes one or more interface components 1326 that are communicatively coupled to the bus 1318 and facilitate interaction with the computer 1312. By way of example, the interface component 1326 can be a port (e.g., serial, parallel, PCMCIA, USB, FireWire . . . ) or an interface card (e.g., sound, video, network . . . ) or the like. The interface component 1326 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1312 to output device(s) via interface component 1326. Output devices can include displays (e.g., CRT, LCD, plasma . . . ), speakers, printers and other computers, among other things.

FIG. 14 is a schematic block diagram of a sample-computing environment 1400 with which the subject innovation can interact. The system 1400 includes one or more client(s) 1410. The client(s) 1410 can be hardware and/or software (e.g., threads, processes, computing devices). The system 1400 also includes one or more server(s) 1430. Thus, system 1400 can correspond to a two-tier client server model or a multi-tier model (e.g., client, middle tier server, data server), amongst other models. The server(s) 1430 can also be hardware and/or software (e.g., threads, processes, computing devices). The servers 1430 can house threads to perform transformations by employing the aspects of the subject innovation, for example. One possible communication between a client 1410 and a server 1430 may be in the form of a data packet transmitted between two or more computer processes.

The system 1400 includes a communication framework 1450 that can be employed to facilitate communications between the client(s) 1410 and the server(s) 1430. Here, the client(s) can correspond to network computing devices and the server(s) can form at least a portion of the cloud. The client(s) 1410 are operatively connected to one or more client data store(s) 1460 that can be employed to store information local to the client(s) 1410. Similarly, the server(s) 1430 are operatively connected to one or more server data store(s) 1440 that can be employed to store information local to the servers 1430. By way of example, one or more servers 1430 and associated data stores 1440 may for a cloud of services are accessible via one or more clients 1410. As per aspects of the disclosure, clients 1410 can turn to the cloud of services for provisioning of private entity IT.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. An information technology (IT) system, comprising: a processor; a service component executable by the processor to manage at least one third-party off-premise resource to remotely provide at least one private IT network to a respective entity according to a subscription; an optimization component executable by the processor to optimize interaction between the at least one third-party off-premise computer resource and local on-premise devices of the respective entity; a computation component executable by the processor to: allocate processing power of the at least one third-party off-premise resource in real time and based at least in part on historical data regarding resource usage; perform a portion of computations of the respective entity based at least in part on resource availability and a computational load of the local on-premise devices of the respective entity; predict distribution of processing resources between the on-premise devices and the third-party off-premise resource based at least in part on processing resource usage; and facilitate computational division amongst the on-premise devices and the third-party off-premise resource available under the subscription; a monitor component executable by the processor to discriminate between work and personal use of resources, based at least in part on the combination of pattern recognition, user actions, and context information, wherein the monitor component provides information about user productivity to the entity; and a cache component executable by the processor to implement: an on-premise cache scheme to facilitate local execution when disconnected from the at least one off-premise resource; and a predictive cache component caching off-premise data on one of the local on-premise devices based at least in part on a probability data being processed by one of the local on-premise devices, the probability calculated at least in part based on access by one of the local on-premise devices to other data.

2. The system of claim 1, further comprising a distribution component executable by the processor to identify a computation division between the on-premise devices and the off-premise resources as a function of computational power of an on-premise device and the available off-premise resources.

3. The system of claim 2, further comprising a component executable by the processor to determine computational power of an on-premise device.

4. The system of claim 2, further comprising a component executable by the processor to identify the available off-premise resources based at least in part on the subscription.

5. The system of claim 1, the computation component executable by the processor to divide computation between the on-premise devices and the off-premise resources during runtime as a function of at least one of workloads or communication latency.

6. The system of claim 1, further comprising a procurement component executable by the processor to facilitate acquisition of rights to resources of local clients for use by the service component.

7. The system of claim 6, the procurement component operates an auction wherein users offer resources for sale.

8. A method of provisioning information technology (IT) services, comprising the following computer-implemented acts: provisioning, by a server of a cloud network executing an IT service component, at least one third-party off-premise computer resource remotely to provide at least one IT network to a plurality of entities according to a respective subscription associated with each of the plurality of entities; optimizing, by the server, interaction between third-party off-premise resources and on-premise devices of the plurality of entities based at least in part on historical data regarding resource usage; allocating, by the server, processing power of the at least one third-party off- premise computer resource in real-time to perform a portion of computations of a respective entity based at least in part on resource availability and a computational load of the local on premise devices of the respective entity; implementing, by the server, an on-premise cache scheme to facilitate local execution when the respective entity is disconnected from the at least one third-party off-premise computer resource; implementing, by the server, a predictive cache scheme caching off-premise data on the local on-premise devices of the respective entity based at least in part on a probability of data being processed by the local on-premise devices, the probability calculated at least in part based on access by the local on-premise devices to other data; monitoring, by the server, network interactions; and discriminating, by the server, between work and personal use of network resources based at least in part on the combination of pattern recognition, user actions, and context information, wherein the pattern recognition, the user actions, and the context information are provided by the monitored network interactions; and providing information about productivity of users derived from the discriminating to one or more of the plurality of entities.

9. The method of claim 8, further comprising dividing computation amongst a particular local on-premise device of the respective entity and the third-party off-premise resources.

10. The method of claim 9, further comprising identifying computational ability of the particular local on-premise device.

11. The method of claims 10, further comprising identifying available resources afforded by the respective subscription of the respective entity.

12. The method of claim 9, further comprising distributing computation between the local on-premise device and the third-party off-premise resource during runtime based at least in part on at least one of workloads or communication latency.

13. The method of claim 9, further comprising predicting optimal distribution of processing resources based at least in part on at least one of likely processing resource usage or allocation.

14. The method of claim 9, further comprising subscribing to additional resources to optimize distribution.

15. The method of claim 8, wherein the predictive cache scheme is applied across the plurality of entities such that performance of the at least one third-party off-premise computer resource is optimized with respect to the plurality of entities as a whole.

16. The method of claim 8, further comprising procuring, by the server, rights to utilize one or more on-premise devices of one of the plurality of entities by operating an auction wherein at least the respective one of the plurality of entities offer usages of on-premise devices for sale.

17. The method of claim 16, wherein the usages of on-premise devices includes the usage of a graphics card.

18. A computer-readable storage device configured with instructions that, when executed, instruct a processor to perform acts comprising: provisioning off-premise computer resources to form an organizational IT network of an entity; optimizing interaction between on-premise devices and the off premise computer resources as a function of computational ability of the on-premise devices, the off- premise computer resources afforded by a subscription, a computational load, communication latency, and historical data regarding processing resource usage dividing computation between the on-premise devices and the off-premise computer resources available under the subscription; allocating processing power of the off-premise computer resources in real-time to perform a portion of computations of the entity; implementing an on-premise cache scheme to facilitate local execution when disconnected from at least one off-premise computer resource; implementing a predictive cache scheme caching off-premise data on an on- premise device based at least in part on a probability of data being processed by the on-premise device, the probability calculated at least in part based on access by the on- premise device to other data; discriminating between work and personal use of network resources based at least in part on a combination of pattern recognition, user actions, and context information; providing information about productivity of users derived from the discriminating to the entity and procuring a deal between the on-premise devices and the off-premise computer by operating an auction through which the off-premise computer purchases the rights to utilize the on-premise devices, wherein the off-premise computer purchases the combination of processing power, disk space, and ,graphics card usage.

19. The computer readable storage device of claim 18, wherein the predictive cache scheme caches data frequently accessed by users of the organizational IT network of the entity on the on-premise device.

20. The computer readable storage device of claim 18, further configured to perform acts comprising predicting distribution of processing resources between the on-premise devices and the off-premise computer based at least in part on processing resource usage.

* * * * *